S. Perry.
Horse Power.
No. 2,635. Reissued June 4, 1867.
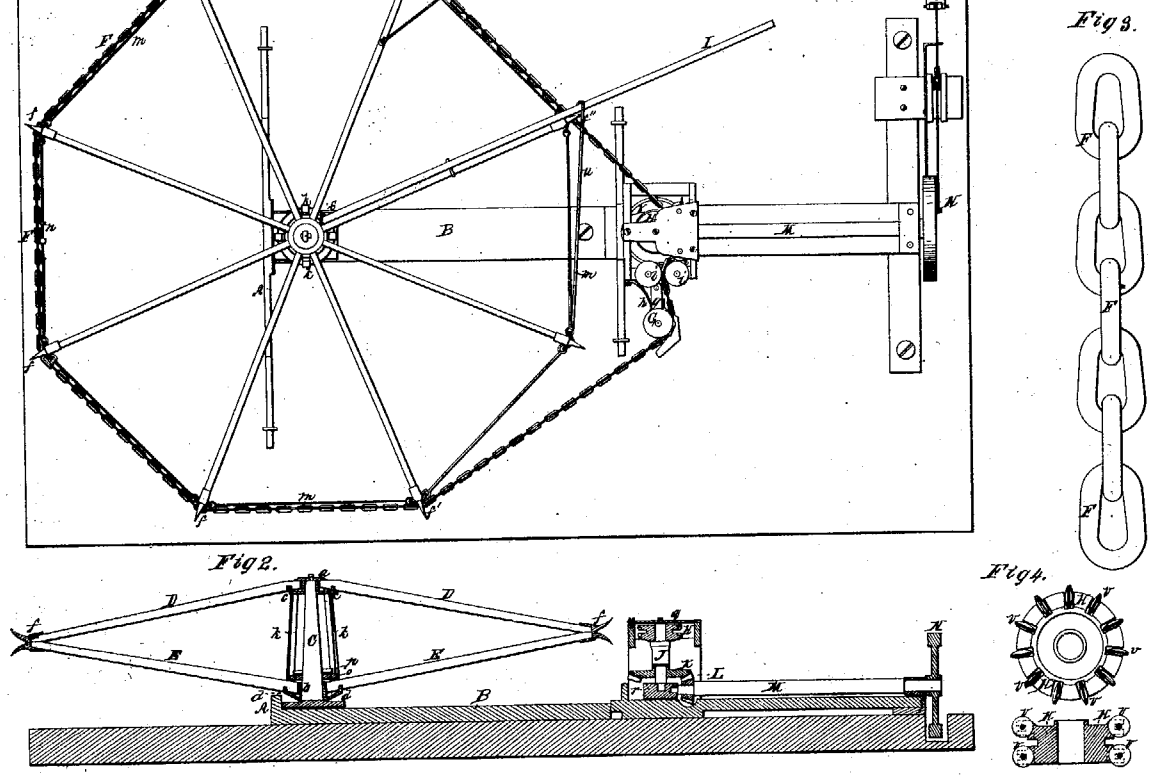
Witnesses.
P. E. Wilson
E. Evans Jr.
Inventor.
Stuart Perry.
By atty A. B. Lightfoot
N. PETERS, PHOTO-LITHOGRAPHER, WASHINGTON, D. C.

United States Patent Office.

STUART PERRY AND ADELINE PERRY, OF NEWPORT, NEW YORK, ASSIGNEES BY MESNE ASSIGNMENTS OF STUART PERRY.

*Letters Patent No.* 39,324, *dated July* 21, 1863; *reissue No.* 2,635, *dated June* 4, 1867.

IMPROVEMENT IN HORSE-POWERS.

The Schedule referred to in these Letters Patent and making part of the same.

TO ALL WHOM IT MAY CONCERN:

Be it known that I, STUART PERRY, of Newport, in the county of Herkimer, and State of New York, have invented certain new and useful improvements in Horse-Powers, and that the following is a full, clear, and exact description of the same, reference being had to the accompanying drawings, making a part of this specification, in which the construction and operation of the horse-power is fully set forth and explained.

Figure 1 represents a top plan of the horse-power.

Figure 2 represents a longitudinal vertical section through the same; and

Figure 3 represents, on an enlarged scale, a case-hardened chain which I use on the horse-power.

Figure 4 represents a modification of the chain-wheel or pulley, also on an enlarged scale.

Similar letters of reference, where they occur in the several separate figures, denote like parts of the horse-power in all the drawings.

My invention consists, first, in the combination of an endless chain, having the form of a common coil chain, (that is, where in their natural untwisted positions, the connecting-links are at, or nearly at, right angles with each other,) with a pulley driven by it, and so made that, whilst a bed furnished with projecting teeth or ribs receives the one class of links in such a way as to prevent their slipping, a recessed portion of said pulley below said bed shall receive the inner projecting parts of the connecting-links or the links that hold relatively opposite positions.

My invention further consists in an endless chain, in combination with a pulley driven by it, when the pulley has steel or chilled teeth or ribs to prevent the chain from slipping upon it.

My invention further consists in an endless chain, in combination with a pulley driven by it, when the pulley is furnished with pieces inserted and movable for the purpose of preventing the chain from slipping and to make better adjustments, and thus to increase the durability of the chain and other parts working with it.

My invention further consists in the combination of an endless chain with the pulley driven by it, (when the pulley is furnished with teeth, ribs, or recesses, to prevent the chain from slipping,) with a piece or part that is moved or governed in such a way when the power is operated that it takes up the slack of the chain and gives it a more uniform tension.

My invention further consists in an endless chain, in combination with the pulley driven by it, when said pulley is furnished with ribs or teeth or recesses to prevent the chain from slipping, and also in combination with a guide-piece or pieces to guide the chain, as it passes from the driving-wheel, accurately into or upon the said pulley.

My invention further consists in an endless chain, in combination with a pulley driven by it, when a wheel or wheels are so placed as to hold the links of the chain in the recesses, or between the ribs or teeth of said pulley.

My invention further consists in an endless chain, in combination with one or more pulleys or pieces, so constructed with a narrow groove as to admit the projecting parts of the alternate links of a coil chain, whilst the connecting-links rest upon the periphery, (or raised sides of the grooves,) each side of the narrow groove, to prevent the twisting of the chain.

My invention further consists in combining with a sprocket or drive-wheel and chain a screw-buckle, or its equivalent, for keeping the outer ends of the arms in firmer position, and for tightening up joints and for keeping all the parts taut, as also for loosening up the parts when said wheel is to be taken down for transportation.

My invention further consists in an endless chain, in combination with metallic forks to receive it on the large driving-wheel, and an apparatus to take up the slack and guide the chain to the pulley to be driven by it, said pulley having ribs or notches to receive and hold the chain.

My invention further consists in the use of the upper and lower metallic arm-holders, having sockets to receive the inner ends of the arms, the upper one being pivoted on the top of the centre post of the large drive-wheel.

My invention further consists in arranging the arms of the drive-wheel in pairs, vertically, one over the other, for giving greater stability to the wheel.

My invention further consists, in combination with an endless chain and a drive-wheel, in the use of socket to hold the outer and inner ends of the arms of said drive-wheel.

My invention further consists in the use of sockets, or their equivalents, to hold the outer ends of the drive wheel, to facilitate the setting up and taking down of said wheel, as well as to strengthen it when up.

And my invention further consists in the use of iron rods as tie-rods at or near the extremities of the arms of the large driving-wheel, in combination with an endless chain passing around said driving-wheel.

And my invention further consists in constructing the large drive-wheel with sockets and tie-rods and a screw-buckle, in such manner as wholly or partly to dispense with the use of bolts and nuts or keys, for the purpose of facilitating the setting up and taking down of the wheel for field purposes, transportation, &c.

And my invention further consists in combining with an endless chain, and a recessed and ribbed pulley driven by it, one or more metallic arm-holders for holding the inner ends of the arms of the drive-wheel on which the chain works.

And my invention further consists in combining with an endless chain and a sprocket or drive-wheel, and a recessed or toothed pulley driven by said chain, a piece or part that moves while the power is working to take up the slack, and a series of arms in pairs for giving greater stability to the wheel and more facilities in use.

And my invention further consists in combining with a sprocket-wheel and a driven wheel, pulley, or drum, a case-hardened steel or cemented chain, for the purpose of preventing its being unduly cut or worn away, and giving it greater durability.

To enable others skilled in the art to make and use my invention, I will proceed to describe the same with reference to the drawings.

A B represent the bed-pieces upon which the horse-power is placed. These pieces may be of plank, for convenience of transportation, or any other suitably strong material. C is a stationary shaft, on or against which the two hubs *a b* turn. These hubs are furnished with flanged disks *c d*, on which flanges the arms D E rest, by means of notches, as distinctly seen in fig. 2. The arms, in pairs, incline towards each other at their outer ends, and a forked socket, *f*, is driven or put over them, which, together with their central notched supports at the hubs *a b*, make them rigid, whilst at the same time the whole machine can be taken down for transportation or storage, and as readily set up again without pins, screw-bolts, or such like fastenings, which are liable to be lost or mislaid. The hubs *a b* are properly braced by the uprights *k* extending from one to the other. The arms D E are tied together at their outer ends by rods *m* extending from one to the other throughout the series, and one of the rods has a screw-buckle, *n*, upon it, by which the whole series may be tightened up to give solidity and firmness to the wheel, or to slacken up with when the machine is to be taken down. A washer, *o*, is placed over the lower hub *b*, and a pin, *p*, passing through the shaft or journal *c* keeps it in proper place thereon. The upper hub *a* rests upon or is suspended from the top of the shaft C, as shown.

The sweep I may be hooked on to the hub *a*, as at *s*, and to one of the arms, as at *t*, and may have a drag-rod, *u*, extending from it to the next arm in rear of it, to distribute the draught of the team, and all these fastenings are readily detachable when the machine is to be taken down. *j* is a leading-rod for leading or guiding the team in its circuit.

The chain F is an endless one, and has its links at right angles to each other, as shown in the drawings. This chain passes around in the forks *f*, at the ends of the arms D E, until it leaves the fork *f'*; from this fork the chain passes to and partially around a pulley or friction-wheel, G, which is in or on a hinged arm, *g*, that is controlled by a spring, *h*, which bears against it, to press out the chain or increase its circuit, and thus take up any slack that there may be in the chain. From the pulley G the chain passes between guiding-pulleys *i i*, which are so set as to give the chain more "bite" upon the power-transmitting toothed or ribbed pulley H. Other small guiding-pulleys 2 2 are used to carry and keep the chain truly to and upon the pulley H. After the chain passes from the pulley H it is caught or taken by the forks *f''*, and thence passes around the series of forks, which form a sprocket-wheel with which the chain moves and acts. I is a sweep by which the chain and its supporting-wheels or arms are moved around by the team, and a leading-stick, *j*, may be attached in advance of the sweep to lead around the team.

I have found that the greatest wear in a chain horse-power is, first, in the chain, and, secondly, in the power-transmitting pulley, over or against which the chain works. To prevent the wearing away of the chain I case-harden it or put it through the process of cementation, which makes it much more durable, as it is thereby converted into semi-steel. The process of case-hardening or cementing, by animal or vegetable charcoal and many other ingredients, by which the iron is carbonized or a hard skin put upon it, is well known, and I lay no claim to the process, but I believe I am the first to carbonize or put a hard surface upon a chain of any kind, and certainly for a horse-power chain. The pulley over or against which the chain works has steel or chilled ribs or teeth, to resist the cutting and wearing of the chain upon it, and these ribs or teeth are so formed as to receive and hold the links of the chain as they pass in contact with them, and to readily release the links of the chain when they are to leave them and the chain is to pass on to the main drive-wheel in its circuit.

At fig. 4 I have shown a modification of the chain-pulley H, and on an enlarged scale, in which I have arranged a series of movable teeth, *v v v*, &c., of chilled or hard metal, against which the endless chain F bears, instead of against the rigid teeth made upon the pulley itself, as seen in fig. 2. These movable teeth *v* are arranged in an open seat or recess, so that they may be readily taken out or replaced, and whilst they cannot move towards the centre of the pulley, and thus reduce the whole circumference of the pulley, they may, by means of the open seat or recess, be moved outward, and thus enlarge the bearing perimeter of said wheel; and to bring different bearing surfaces into contact with the chain these movable teeth may turn, so as to present constantly changing surfaces, which makes the pulley-wheel much more enduring and prevents much cutting and wearing away.

The shaft J on which the chain-pulley H is placed has its upper support in a top plate, *q*, and a step bearing in or at its lower end in the block *r*, and this block *r* also affords a journal-support for the shaft M. The power transmitted to the pulley H from the main circuit-wheel through the chain F is communicated through the shaft J to the gear-wheel K, and from said gear-wheel to the bevel-pinion L on the shaft M, which has, at its other end, a band or crank-wheel, N, from which the power may be taken and applied to any machinery to be driven by it. I have shown a sawing apparatus as connected therewith, but this constitutes no part of this invention.

The pulleys *i i*, in addition to their hereinabove described duty of guiding the chain and increasing its "bite" on the main pulley, perform another important function, viz, preventing any twist or kink in the chain when or where it is to come in contact with the chain-pulley. The links of the chain being placed at right angles to each other the horizontal link enters the groove or recess of the tooth it first meets, and the rounded end of the vertical link bears against the side of the same tooth; and that the links should be brought up in the right position to so take into and against the teeth of the driving-pulley H, and compel the pulley to move with the chain without slipping thereon, the links should come up and be presented without any twist or kink in them. Whatever slack there may be in the chain does not pass or get beyond the spring-pulley G, and the chain may sag before it reaches the yielding or compensating pulley G, but beyond said pulley it is "taut" and strained up.

The contact between the chain and the main driving-pulley is not frictional contact simply, for that could not be relied upon of itself. The contact between the two parts, viz, the chain and the drive-wheel, is positive contact, as the links of the chain take into or against depressions in or on the pulley, and cannot, under its otherwise "taut" condition, slip thereon, whilst it is free to leave the pulley or its depressions when its onward circuit makes it a tangent to the perimeter of the said pulley.

It will be perceived that the chain does not pass directly from the wheel G to the power-transmitting wheel or pulley H, but is deflected by the small pulley *i*, and thus caused to encircle more of the pulley H, and consequently have more "bite" or contact with it and more propelling power, as there is a greater number of the links of the chain in contact with it.

Having thus fully described the nature, object, and purpose of my invention, what I claim therein as new, and desire to secure by Letters Patent, is—

The combination of an endless chain with a pulley driven by it, and so made that, whilst a bed or bearing furnished with projecting teeth or ribs receives one class of links in such a way as to prevent their slipping, a recessed portion of said pulley shall receive the other or connecting-links that hold relatively opposite positions with regard to the other class, substantially as described.

I also claim, in combination with an endless chain and a pulley driven by it, the steel or chilled teeth or ribs on said pulley, substantially as and for the purpose described.

I also claim the combination of an endless chain, and a pulley driven by it, when said pulley is furnished with pieces inserted and movable for the purpose of preventing the chain from slipping and to make better adjustments, and thus increase the durability of the chain and other parts working with it, substantially as described.

I also claim, in combination with an endless chain and a pulley driven by it, said pulley being furnished with teeth, ribs, or recesses to prevent the chain from slipping, a device that is moved or governed in such a way, when the power is operated, that it takes up the slack of the chain and makes a more uniform tension, substantially as described.

I also claim, in combination with an endless chain, and with a ribbed, toothed, or recessed pulley driven by it, guide-pieces to guide the chain as it passes from the driving-wheel accurately into or upon said pulley, substantially as described.

I also claim, in combination with an endless chain and a pulley driven by it, a wheel or wheels, so placed as to hold the links of the chain in the recesses or between the ribs or teeth of said pulley, substantially as described.

I also claim the combination of an endless chain with one or more pieces or pulleys, so constructed with a narrow groove as to admit the projecting parts of the alternate links of a coil chain, whilst the connecting-links rest upon the periphery each side of the narrow groove to prevent the twisting of the chain, substantially as described.

I also claim, in combination with a sprocket or main wheel and chain, a screw-buckle, or its equivalent, for taking up and keeping the outer ends of the arms in firmer position, tightening up joints, and for keeping all the parts "taut," as also for loosening up the parts when said wheel is to be taken down for transportation, substantially as described.

I also claim, in combination with an endless chain and a ribbed or notched pulley driven by it, the metallic forks to receive and carry said chain, and an apparatus to take up the slack of the chain and guide the chain to the pulley, substantially as described.

I also claim the combined use of the upper and under metallic arm-holders, having suitable provision to receive the inner ends of the arms, and the upper holder pivoted on the top of the centre post of the large drive-wheel, substantially as and for the purpose described.

I also claim arranging the arms of the drive-wheel in pairs, vertically, one over the other, for giving great stability to the wheel, substantially as described.

I also claim, in combination with an endless chain and a drive-wheel, the use of sockets to hold the outer and inner ends of the arms of said drive-wheel, substantially as described.

I also claim the use of sockets to hold the outer ends of the drive-wheel arms, to facilitate the setting up and taking down of said wheel, as well as to strengthen it when up, substantially as described.

I also claim the use of iron tie-rods, at or near the extremities of the arms of the large driving-wheel, for tying said arms, in combination with an endless chain, substantially as described.

I also claim constructing the large drive-wheel with sockets and tie-rods and a screw-buckle, in such manner as wholly or partially to dispense with the use of bolts and nuts or keys, and thus facilitating the setting up and taking down of the wheel, when used in the field, or when it is to be transported, substantially as described.

I also claim, in combination with an endless chain and a recessed and ribbed pulley driven by it, one or more metallic arm-holders, for holding the inner ends of the arms of the drive-wheel on which the chain works, substantially as described.

I also claim, in combination with an endless chain and a sprocket or drive-wheel and a recessed or toothed pulley driven by said chain, a piece or part that moves while the power is working to take up the slack, and a series of arms, in pairs, for giving greater stability to the wheel and more facilities in use, substantially as described.

I also claim, in combination with a sprocket-wheel and a driven wheel, pulley, or drum, a case-hardened steel or cemented chain, for the purpose of preventing its being unduly cut or worn away, and thus increasing its durability, substantially as described.

I also claim, in combination with an endless chain and a pulley driven by it, a wheel-pulley or deflecting device for changing the direction of the chain as it passes from the main wheel to the power-transmitting pulley for the purpose of causing the chain to further encircle the driven pulley, by giving it more "bite" or contact therewith, substantially as described.

STUART PERRY.

Witnesses:

JOHN G. BARRY,

WM. H. CHAPMAN.